United States Patent Office 3,041,344
Patented June 26, 1962

3,041,344
1-(AROYLALKYL)-4-PIPERIDINECARBOXAMIDES
Paul A. J. Janssen, Vosselaar, near Turnhout, Belgium, assignor to Research Laboratorium Dr. C. Janssen, N.V., Beerse, Belgium, a company of Belgium
No Drawing. Filed Dec. 1, 1960, Ser. No. 72,855
6 Claims. (Cl. 260—294)

The present invention relates to a new group of piperidinecarboxamides and, more particularly, to 1-(aroylalkyl)-4-piperidinecarboxamides of the general structural formula

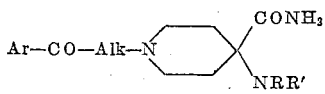

wherein Ar is a member of the class of radicals consisting of phenyl, tolyl, xylyl, halophenyl, methoxyphenyl, dimethoxyphenyl, and 2-thienyl. Alk is a lower alkylene radical of more than one carbon atom and NRR' is a member of the class of radicals consisting of dimethylamino, pyrrolidino, dimethylpyrrolidino, piperidino, dimethylpiperidino and morpholino.

In the foregoing structural formula one of the preferred embodiments of the invention is the one in which the radical Ar is a halophenyl radical. While this halophenyl radical can be fluorophenyl, chlorophenyl, bromophenyl and iodophenyl the maximum activity is observed with the compounds in which Ar is a fluorophenyl radical.

The radical Alk represents a lower alkylene radical such as ethylene, propylene, trimethylene, methylpropylene, and tetramethylene. Best activity is obtained with the trimethylene configuration.

The compounds of this invention are potent inhibitors of the central nervous system. However the activity is quite unlike that of many other central nervous system inhibitors such as the barbiturates because this compound is non-neurological in its action. This is exemplified by inactivity in the righting-reflex test, but high potency in checking aggressive behavior in animals. The compound is also a potent inhibitor of tryptamine-induced convulsions. Some of these properties suggest a unique mode of action.

The compounds of this invention can be advantageously prepared by the condensation of a compound of the structural formula Ar-CO-Alk-Halogen with an appropriately selected piperidinecarboxamide of the structural formula

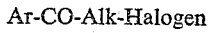
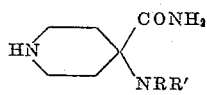

Condensation can be carried out in an inert solvent such as aromatic hydrocarbon (e.g. benzene, toluene, xylene), a lower alkanol (e.g. ethanol, propanol, butanol), and a lower alkanone (e.g. acetone, butanone, pentanone, hexanone, and 4-methyl-2-pentanone). In certain cases the reaction can be usefully accelerated by use of elevated temperatures.

Alternatively, the compounds of this invention can be prepared by reacting a compound of the structural formula Ar-CO-Alk-Halogen with an appropriately selected piperidine carboxylic acid of the formula

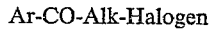
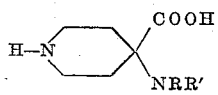

wherein NRR' is defined as above. The resultant acid is then converted to the corresponding acid chloride by means of thionyl chloride or phosphorous pentachloride and the halide is reacted with ammonia to give the desired product.

Another method proceeds as above but uses a compound of the formula

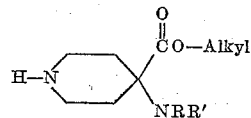

in place of the corresponding carboxylic acid. The resultant ester is then reacted with ammonia to produce the amide.

The organic bases of this invention form pharmaceutically useful non-toxic salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride, and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight, temperatures are expressed in degrees centigrade (° C.), and pressures are expressed in millimeters of mercury (mm.).

*Example 1*

To a stirred solution of 130.4 parts of potassium cyanide and 243.2 parts of piperidine hydrochloride in a mixture of 800 parts of water and 320 parts of ethanol is added portionwise 378 parts of 1-benzyl-4-piperidone. After about one hour a solid starts to precipitate. Stirring is continued for 24 hours. The reaction mixture is filtered and the solid is recrystallized from 1200 parts of diisopropyl ether. On cooling to room temperature a first crop of 1-benzyl-4-cyano-4-piperidino-piperidine melting at about 104–106° C. is obtained. By concentrating and further cooling of the mother liquor a second crop of the above compound is obtained.

A mixture of 14.1 parts of 1-benzyl-4-cyano-4-piperidinopiperidine and 40 parts of 90% sulfuric acid is heated on a steam bath for 10 minutes. Without further heating, the mixture is stirred until a temperature of about 20° C. is obtained. The mixture is then poured into 150 parts of ice-water and the resultant solution is alkalized with excess ammonium hydroxide solution. The aqueous solution is decanted from the precipitated oil. On treating this oil with 80 parts of acetone, crystallization sets in. After one hour the solid is filtered off and dried to yield 1-benzyl-4-piperidinopiperidine-4-carboxamide melting at about 137.5–140° C.

A mixture of 215 parts of 1-benzyl-4-piperidinopiperidine-4-carboxamide, 1200 parts of isopropyl alcohol, 1000 parts of distilled water and 157 parts of hydrogen chloride is debenzylated under atmospheric pressure and at a temperature of about 40° C. in the presence of 40 parts of a 10% palladium-on-charcoal catalyst. After the calculated amount of hydrogen is taken up, hydrogenation is stopped.

The mixture is filtered and the filtrate is evaporated. The semi-solid residue is treated with a mixture of 80 parts of acetone and 80 parts of benzene and evaporated again. The residue is triturated in 200 parts of methanol and filtered, yielding the dihydrochloride of 4-piperidinopiperidine-4-carboxamide melting at about 299–300.8° C. with decomposition. A sample of 20 parts of the dihydrochloride is dissolved in 30 parts of water. The aqueous solution is alkalized with 15 parts of 44% sodium hydroxide and stirred for a short time. The solid obtained is filtered off yielding crude product. To separate the free base from organic and inorganic salts, it is extracted overnight in a Soxhlet apparatus with toluene. The toluene extract is evaporated and the solid residue is filtered off, yielding 4-piperidinopiperidine-4-carboxamide melting at about 118.5–119.5° C. This compound has the structural formula

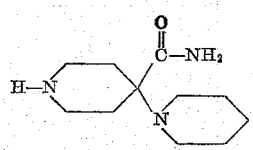

Example 2

To a solution of 35.5 parts of pyrrolidine in 80 parts of ethanol is added slowly a mixture of 47.5 parts of concentrated hydrochloric acid and 200 parts of water. To the resultant solution are added, first, 32.6 parts of potassium cyanide and then, portionwise in the course of 15 minutes, 123 parts of 1-benzyl-4-piperidone. The mixture is stirred and after about 15 minutes a solid is deposited. Stirring is continued for 14 hours at room temperature. The solid is filtered and then recrystallized from 400 parts of diisopropyl ether. After cooling at 0° for 3 hours, there is obtained 1-benzyl-4-cyano-4-(1-pyrrolidinyl)piperidine melting at about 86–89° C.

Two hundred seventy parts of 1-benzyl-4-cyano-4-(1-pyrrolidinyl)piperidine are added portionwise in the course of about 10 minutes to 1260 parts of 90% sulfuric acid which had been cooled in an ice bath to about 10° C. After heating the mixture at 100° C. for 10 minutes, it is cooled while stirring for one hour. The mixture is poured into ice water. The resultant solution is alkalized with concentrated ammonium hydroxide at a temperature of 25–40° C. while cooling in an ice bath. An oil is formed which solidifies on stirring. The precipitate is filtered and triturated in 240 parts of acetone to yield 1-benzyl-4-(1-pyrrolidinyl)piperidine-4-carboxamide melting at about 112.5–114° C. On recrystallization from ethanol the product melts at about 124–126.5° C.

A mixture of 279 parts of 1-benzyl-4-(1-pyrrolidinyl)-piperidine-4-carboxamide, 1000 parts of isopropyl alcohol, 625 parts of distilled water, and 200 parts of concentrated hydrochloric acid is debenzylated under atmospheric pressure at room temperature in the presence of 55 parts of a 10% palladium-on-charcoal catalyst. After the calculated amount of hydrogen is taken up, hydrogenation is stopped. The mixture is filtered and the filtrate is evaporated. The residue is boiled in 400 parts of acetone. The sticky precipitate is filtered off and triturated in 200 parts of methanol yielding the crude dihydrochloride of 4-(1-pyrrolidinyl)piperidine-4-carboxamide. A sample of 20 parts of the dihydrochloride is dissolved in 40 parts of water. The aqueous layer is alkalized with 20 parts of 44% sodium hydroxide. Then 5 parts of potassium carbonate is added and a solid is obtained while stirring. It is filtered off to give crude product. This crude product is extracted overnight in a Soxhlet apparatus with toluene. After cooling the toluene extracts to room temperature, a precipitate is formed. This is filtered yielding 4-(1-pyrrolidinyl)piperidine-4-carboxamide melting at about 141–142° C.

Example 3

To a solution of 43.5 parts of morpholine in 80 parts of ethanol is added slowly a mixture of 47.4 parts of concentrated hydrochloric acid and 200 parts of water. To the resultant solution are added, first, 32.6 parts of potassium cyanide and then, dropwise over a period of 15 minutes, 123 parts of 1-benzyl-4-piperidone. The mixture is stirred and after about 15 minutes a solid is deposited. Stirring is continued for 14 hours at room temperature. The solid is filtered and then recrystallized from 720 parts of diisopropyl ether to yield 1-benzyl-4-morpholino-4-cyanopiperidine melting at about 117–117.8° C.

One hundred twenty parts of 1-benzyl-4-cyano-4-morpholinopiperidine is added portionwise to 530 parts of 90% sulfuric acid which had been cooled to 5° C. The mixture is heated for 10 minutes at 95° on a water bath. The water bath is removed and the mixture is stirred for one hour. The reaction mixture is poured into 900 parts of ice. After cooling in an ice bath it is alkalized with concentrated ammonium hydroxide. The separated oil is extracted with 4,500 parts of chloroform. The chloroform is separated, dried, and evaporated. The solid residue is boiled in 120 parts of acetone. After cooling overnight at room temperature, 1-benzyl-4-morpholinopiperidine-4-carboxamide melting at about 150–151° C. is filtered off.

A mixture of 15 parts of 1-benzyl-4-morpholinopiperidine-4-carboxamide in 160 parts of 95% ethanol is debenzylated under atmospheric pressure and at room temperature in the presence of 5 parts of a 10% palladium-on-charcoal catalyst. After the calculated amount of hydrogen is taken up, hydrogenation is stopped. The mixture is filtered and the charcoal is boiled with 80 parts of methanol and filtered again. The combined filtrates are evaporated and the semi-solid residue is treated with diisopropy ether and evaporated again. The solid residue is washed with 40 parts of acetone and filtered yielding 4-morophlinopiperidine-4-carboxamide melting at about 182.5–186.5° C.

By substituting dimethylamine for the morpholine in the above procedure, there is obtained 4-dimethylaminopiperidine-4-carboxamide melting at about 118–121.4° C.

Example 4

A solution of 71 parts of γ-chlorobutyryl chloride and 63 parts of benzene is added with stirring and cooling to a suspension of 71 parts of aluminum chloride in 310 parts of benzene. After the addition is complete, the cooling bath is removed and stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-chlorobutyrophenone, boiling at about 134–137° C. at 5 mm. pressure.

Example 5

To a suspension of 341 parts of aluminum chloride in 1740 parts of carbon disulfide are added 96 parts of chlorobenzene with stirring and cooling. While the temperature is maintained at about 10° C., 141 parts of γ-chlorobutyryl chloride is added. After the addition is complete the cooling bath is removed and the stirring is continued for 2 hours. The reaction mixture is poured into ice water. The organic layer is separated, washed with water, dried over anhydrous sodium sulfate, and filtered. The filtrate is concentrated under reduced pressure and the residue is distilled to yield γ-chloro-p-fluorobutyrophenone boiling at about 136–142° C. at about 6 mm. pressure. This compound has the structural formula

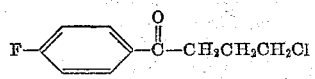

By substitution of the appropriate starting materials in the procedure of the above paragraph and otherwise following the procedure outlined therein the following compounds are obtained:

γ,4-dichlorobutyrophenone boiling at about 135–140°

C. at 8 mm. pressure.

γ-Chloro-4-methylbutyrophenone boiling at about 100–110° C. at 4 mm. pressure.

γ-Chloro-4-methoxybutyrophenone boiling at about 175° C. at 6 mm. pressure.

Example 6

To a mixture of 4.1 parts of 4-piperidinopiperidine-4-carboxamide, 6.4 parts of sodium carbonate, and a few crystals of potassium iodide in 100 parts of anhydrous toluene is added dropwise a solution of 5.6 parts of γ-chloro-4-fluorobutyrophenone and 40 parts of anhydrous toluene at a temperature of 30–40° C. The mixture is stirred and refluxed for 48 hours. The reaction mixture is cooled and divided between 50 parts of water and 60 parts of chloroform. The combined organic layers—toluene and chloroform—are dried over potassium carbonate, filtered, and evaporated. The oily residue solidifies on treatment with 80 parts of ether. After cooling for 30 minutes at 0° C. there is obtained 1-[γ-(4-fluorobenzoyl)propyl] - 4 - piperidinopiperidine - 4 - carboxamide melting at about 124.5–126° C. The compound has the structural formula

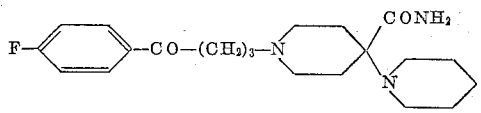

By substituting 5.6 parts of γ-chloro-2-fluorobutyrophenone for the 4-fluoro isomer used above there is obtained 1 - [γ - (2 - fluorobenzoyl)propyl] - 4 - piperidinopiperidine-4-carboxamide.

Example 7

To a mixture of 4 parts of 4-(1-pyrrolidinyl)piperidine-4-carboxamide, 6.4 parts of sodium carbonate, and a few crystals of potassium iodide in 120 parts of anhydrous toluene is added portionwise a solution of 5.6 parts of γ-chloro-4-fluorobutyrophenone and 40 parts of toluene at a temperature of 30–40° C. The whole is refluxed for 40 hours. After cooling the reaction mixture, 50 parts of water is added. The organic layer is separated, dried over potassium carbonate and evaporated. The oily residue is dissolved in 320 parts of ether and hydrogen chloride gas is introduced into it. The precipitated hydrochloride is filtered off and triturated in acetone yielding 1 - [γ - (4 - fluorobenzoyl)propyl] - 4 - (1 - pyrrolidinyl)-piperidine-4-carboxamide dihydrochloride melting at about 236–240° C.

Example 8

To a stirred mixture of 3.9 parts of 4-morpholinopiperidine-4-carboxamide, 6.4 parts of sodium carbonate, a few crystals of potassium iodide and 120 parts of 4-methyl-2-pentanone is added dropwise a solution of 5.6 parts of γ-chloro-4-fluorobutyrophenone in 40 parts of 4-methyl-2-pentanone. The whole is refluxed for 48 hours. After cooling the reaction, 50 parts of water is added. The resultant precipitate is filtered off and recrystallized from a boiling mixture of 80 parts of diisopropyl ether and 48 parts of acetone. After cooling overnight at −20° C. 1-[γ-(4-fluorobenzoyl)propyl]-4-morpholinopiperidine-4-carboxamide melting at about 150–151.8° C. is filtered off.

Example 9

A mixture of 4.7 parts of β-chloropropiophenone, 4.2 parts of 4-piperidinopiperidine-4-carboxamide, 6.6 parts of sodium carbonate, a few crystals of potassium iodide, and 160 parts of anhydrous toluene is refluxed for 60 hours. After cooling the reaction mixture, 50 parts of water is added. The solid is filtered off and triturated in ether yielding crude product. This crude product is boiled in a mixture of 72 parts of diisopropyl ether, 16 parts of ether, and 16 parts of acetone. The undissolved part is filtered off yielding less pure product. The filtrate is cooled to 0° C. yielding 1-(2-benzoyl)ethyl-4-piperidinopiperidine-4-carboxamide melting at about 133–135.8° C.

Example 10

To a stirred mixture of 8 parts of 4-(1-pyrrolidinyl)-piperidine-4-carboxamide, 13 parts of sodium carbonate, and a few crystals of potassium iodide and 160 parts of anhydrous toluene is added dropwise a solution of 9.4 parts of β-chloropropiophenone and 80 parts of toluene. The mixture is refluxed for 48 hours. After cooling the reaction, 100 parts of water is added with stirring. The precipitate is filtered off and triturated in diisopropyl ether to yield 1-(2-benzoyl)ethyl-4-(1-pyrrolidinyl)piperidine-4-carboxamide melting at about 141.6–142.8° C.

Example 11

A mixture of 5.1 parts of γ-chlorobutyrophenone, 3.94 parts of 4-piperidinopiperidine-4-carboxamide, 6.4 parts of sodium carbonate and a few crystals of potassium iodide in 200 parts of anhydrous toluene is stirred and refluxed for 40 hours. After cooling, the reaction is divided between 300 parts of ether and 50 parts of water. The organic layer is separated, dried over potassium carbonate and filtered. Dry hydrogen chloride gas is introduced into this solution and the precipitated hydrochloride is filtered off. It is triturated in acetone to yield 1 - (γ - benzoyl)propyl - 4 - piperidinopiperidine - 4 - carboxamide dihydrochloride melting at about 280–282° C.

By substituting 3.4 parts of 4-dimethylaminopiperidine-4-carboxamide for the 4-piperidinopiperidine-4-carboxamide used above, there is obtained 1-(γ-benzoylpropyl)-4-dimethylaminopiperidine dihydrochloride melting at about 240–244° C.

Example 12

A mixture of 5.1 parts of γ-chlorobutyrophenone, 3.9 parts of 4-(1-pyrrolidinyl)piperidine-4-carboxamide, 6.4 parts of sodium carbonate and a few crystals of potassium iodide in 200 parts of anhydrous toluene is stirred and refluxed for 48 hours. After cooling the reaction mixture, 50 parts of water is added. The organic layer is separated, washed once with water and 320 parts of ether is added. The combined organic layers are dried over potassium carbonate and hydrogen chloride gas is introduced into it. The semi-solid precipitate is filtered off and triturated in acetone to yield 1-(γ-benzoyl)propyl-4-(1-pyrrolidinyl)piperidine-4-carboxamide dihydrochloride melting at about 265–267.5° C.

In the above procedure by substituting 5.9 parts of γ-chloro-2,4-dimethylbutyrophenone and 4.4 parts of 4-[1 - (2,5 - dimethylpyrrolidinyl)]piperidine - 4 - carboxamide for the γ-chlorobutyrophenone and the 4-(1-pyrrolidinyl)piperidine-4-carboxamide respectively, there is obtained 1-[γ-(2,4-dimethylbenzoyl)propyl]-4-[1-(2,5-dimethylpyrrolidinyl)]piperidine - 4 - carboxamide dihydrochloride.

Example 13

A mixture of 4.7 parts of γ-chlorobutyrophenone, 4 parts of 4-morpholinopiperidine-4-carboxamide, 6.4 parts of sodium carbonate and a few crystals of potassium iodide in 200 parts of anhydrous toluene is stirred and refluxed for 60 hours. After cooling, the reaction mixture is washed with 50 parts of water. The organic layer is diluted with 320 parts of ether and dried over potassium carbonate. After filtering, dry hydrogen chloride gas is introduced into this solution. The precipitated sticky solid is filtered, triturated in acetone, and filtered again. It is then recrystallized from a mixture of 52 parts of methanol and 4 parts of water to yield 1-(γ-benzoyl)-propyl-4-morpholinopiperidine-4-carboxamide melting at about 260–265° C.

Example 14

To a stirred mixture of 4.2 parts of 4-piperidinopiperidine-4-carboxamide, 6.4 parts of sodium carbonate and a few crystals of potassium iodide in 80 parts of anhydrous toluene is added dropwise a solution of 5.6 parts of δ-chlorovalerophenone in 40 parts of toluene. After the addition is complete, the mixture is refluxed for 65 hours. After cooling the reaction mixture, 50 parts of water is added. The organic layer is separated, dried over potassium carbonate, filtered and evaporated. The residue is treated with 40 parts of diisopropyl ether and evaporated again. The solid residue is dissolved in 24 parts of acetone and filtered. After cooling overnight at −20° C., 1 - (δ - benzoyl)butyl - 4 - piperidinopiperidine - 4 - carboxamide melting at about 97.4–98.6° C. is filtered off.

*Example 15*

Substitution of an equimolar amount of γ,4-dichlorobutyrophenone for the γ-chlorobutyrophenone in Example 11, yields 1-[γ-(4-chlorobenzoyl)propyl]-4-piperidinopiperidine-4-carboxamide dihydrochloride melting at about 256–261° C. with decomposition.

Substitution of equimolar amounts of γ-chloro-4-iodobutyrophenone and 4-(2,6-dimethylpiperidino)piperidine-4-carboxamide for γ-chlorobutyrophenone and 4-piperidinopiperidine-4-carboxamide respectively in the procedure in Example 11 yields 1-[γ-(4-iodobenzoyl)propyl]-4 - (2,6 - dimethylpiperidino)piperidine - 4 - carboxamide dihydrochloride.

Substitution of an equimolar amount of γ,4-dichlorobutyrophenone for the γ-chloro-4-fluorobutyrophenone in Example 7, yields 1-[γ-(4-chlorobenzoyl)propyl]-4-(1-pyrrolidinyl)piperidine - 4 - carboxamide dihydrochloride melting at about 239.6–242.2° C.

Substitution of an equimolar amount of γ,4-dichlorobutyrophenone for the γ-chlorobutyrophenone in Example 13, yields 1-[γ-(4-chlorobenzoyl)propyl]-4-morpholinopiperidine-4-carboxamide dihydrochloride melting at about 248.5–251.5° C.

*Example 16*

To a stirred mixture of 4 parts of 4-piperidinopiperidine-4-carboxamide, 6.4 parts of sodium carbonate and a few crystals of potassium iodide in 80 parts of anhydrous toluene is added portionwise a solution of 5.4 parts of γ-chloro-4-methylbutyrophenone in 120 parts of anhydrous toluene. The mixture is then stirred and refluxed for 65 hours. After cooling, 50 parts of water is added and the separated aqueous layer is extracted with ether. The combined organic solutions are dried over potassium carbonate and filtered. Dry hydrogen chloride gas is passed into this solution. The precipitated solid is filtered, triturated in boiling acetone and filtered again to yield 1-[γ-(4-toluyl)propyl]-4-piperidinopiperidine-4 - carboxamide dihydrochloride melting at about 267–269.2° C.

By substituting the appropriate starting materials in the above procedure, the following compounds are obtained:

1 - [γ - (4 - toluyl)propyl] - 4 - (1 - pyrrolidinyl)piperidine-4-carboxamide dihydrochloride melting at about 244–257° C. with decomposition.

1 - [γ - (4 - toluyl)propyl] - 4 - morpholinopiperidine - 4-carboxamide dihydrochloride melting at about 250–253° C.

1 - [γ - (4 - methoxybenzoyl)propyl] - 4 - piperidino - piperidine-4-carboxamide melting at about 124–126° C.

1 - [γ - (4 - methoxybenzoyl)propyl] - 4 - ( 1 - pyrrolidinyl)piperidine - 4 - carboxamide melting at about 144.4–146.2 ° C.

1 - [γ - (4 - methoxybenzoyl)propyl] - 4 - morpholinopiperidine-4-carboxamide dihydrochloride melting at about 245–247° C.

1 - [γ - (2,4 - dimethoxybenzoyl)propyl] - 4 - piperidinopiperidine - 4-carboxamide dihydrochloride melting at about 254–258° C.

1 - [γ - (2,4 - dimethoxybenzoyl)propyl] - 4 - (1 - pyrrolidinyl)piperidine - 4 - carboxamide dihydrochloride melting at about 243.5–248° C.

1 - [γ - (2,4 - dimethoxybenzoyl)propyl] - 4 - morpholinopiperidine-4-carboxamide dihydrochloride melting at about 243–246° C.

1 - [γ - (2 - thenoyl)propyl] - 4 - (1 - pyrrolidinyl) - piperidine - 4 - carboxamide dihydrochloride melting at about 275–276.5 ° C.

1 - [γ - (4 - fluorobenzoyl)propyl] - 4 - dimethylaminopiperidine-4-carboxamide dihydrochloride melting at about 227–228.5° C.

1 - [γ - (4 - chlorobenzoyl)propyl] - 4 - dimethylaminopiperidine-4-carboxamide dihydrochloride melting at about 239–250° C. with decomposition.

1 - [γ - (4 - toluyl)propyl] - 4 - dimethylaminopiperidine - 4-carboxamide dihydrochloride melting at about 220–221° C.

1 - [γ - (4 - methoxybenzoyl)propyl] - 4 - dimethylaminopiperidine-4-carboxamide dihydrochloride melting at about 235–236° C.

1 - [γ - (2,4 - dimethoxybenzoyl)propyl] - 4 - dimethylaminopiperidine-4-carboxamide dihydrochloride melting at about 241–242° C.

1 - [γ - (2 - thenoyl)propyl] - 4 - dimethylaminopiperidine-4-carboxamide dihydrochloride melting at about 238–239.4° C. with decomposition.

*Example 17*

Substitution of an equimolar amount of 2-(γ-chlorobutyryl)thiophene for the γ-chlorobutyrophenone in Example 13 yields 1 - [γ-(2-thenoyl)propyl]-4-morpholinopiperidine-4-carboxamide melting at about 255–256° C.

Substitution of an equimolar amount of 2-(γ-chlorobutyryl)thiophene for the β-chloropropiophenone in Example 9 yields 1-[γ-(2-thenoyl)propyl]-4-piperidinopiperidine-4-carboxamide melting at about 122.6–124.2° C. with decomposition. In this case, treatment of the crude oily product with diisopropyl ether causes it to solidify.

What is claimed is:

1. A compound of the formula

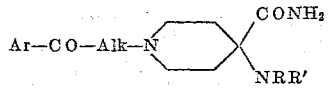

wherein Ar is a member of the class of radicals consisting of phenyl, tolyl, xylyl, halophenyl, methoxyphenyl, dimethoxyphenyl, and 2-thienyl, Alk is a lower alkylene radical of more than one carbon atom and NRR' is a member of the class of radicals consisting of dimethylamino, pyrrolidino, dimethylpyrrolidino, piperidino, dimethylpiperidino and morpholino.

2. A compound of the formula

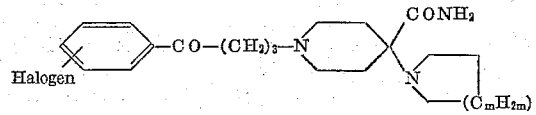

wherein $m$ is a positive integer smaller than 3.

3. 1 - [γ-(4 - fluorobenzoyl)propyl]-4-piperidinopiperidine-4-carboxamide.

4. 1-[γ-(4 - fluorobenzoyl)propyl]-4-(1-pyrrolidinyl)-piperidine-4-carboxamide.

5. A compound of the formula

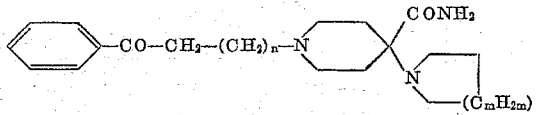

wherein $n$ is a positive integer smaller than 4 and $m$ is a positive integer smaller than 3.

6. 1 - (γ - benzoyl)propyl-4-piperidinopiperidine-4-carboxamide.

No references cited.